United States Patent [19]

Tanaka et al.

[11] Patent Number: 4,638,363
[45] Date of Patent: Jan. 20, 1987

[54] AUTOMATIC BEAM CURRENT CONTROL SYSTEM FOR TELEVISION CAMERA

[75] Inventors: Sadaaki Tanaka; Hisashi Ushijima, both of Kanagawa, Japan

[73] Assignee: Sony Corporation, Tokyo, Japan

[21] Appl. No.: 800,820

[22] Filed: Nov. 22, 1985

[30] Foreign Application Priority Data

Nov. 22, 1984 [JP] Japan ................. 59-247738

[51] Int. Cl.$^4$ ............................................. H04N 3/14
[52] U.S. Cl. .................................................. 358/219
[58] Field of Search ....................... 358/219, 218, 217; 315/383

[56] References Cited

U.S. PATENT DOCUMENTS

| 2,930,929 | 3/1960 | Shelton | 358/219 |
| 3,392,236 | 7/1968 | Nielsen et al. | 358/219 |
| 3,716,657 | 2/1973 | Niemyer, Jr. | 358/219 |
| 3,999,011 | 12/1976 | Sato et al. | 358/219 |
| 4,166,281 | 8/1979 | Dischert et al. | 358/219 |
| 4,306,251 | 12/1981 | Safar | 358/219 |
| 4,379,310 | 4/1983 | Bendell | 315/383 |

Primary Examiner—Gene Z. Rubinson
Assistant Examiner—Stephen Brinich
Attorney, Agent, or Firm—Hill, Van Santen, Steadman & Simpson

[57] ABSTRACT

In an image pickup apparatus or television camera tube in which a signal corresponding to a target current of the television camera tube is supplied to its beam current control electrode to thereby control the beam quantity to become corresponding to the variation of the incident light amount thereon, the present invention is to provide an automatic beam current control system for a television camera in which the signal corresponding to the target current is supplied through a line adder circuit to the beam current control electrode.

The line adder circuit may use, for example, a one horizontal period delay line. Since the control signal supplied to the beam current control electrode is an added value or an average value of the target currents obtained over two scanning periods, the stable control signal is always supplied to the beam current control electrode of the television camera tube so that the image picked up signal of high definition without a line crawl component can be obtained.

7 Claims, 6 Drawing Figures

AUTOMATIC BEAM CURRENT CONTROL SYSTEM FOR TELEVISION CAMERA

BACKGROUND OF THE INVENTION

1. Field of the Invention

The present invention relates to an automatic beam current control system for television camera in which an electron beam with proper quantity is supplied to a photo-electric conversion screen of an image pickup tube or television camera tube in response to an amount of light incident thereon.

2. Description of the Prior Art

Generally, in a photo-electric conversion type television camera tube, the quantity of an electron beam is restricted from a resolution standpoint. However, if the quantity of electron beam is constant, in a bright portion of the photo-electric conversion screen having a large incident light amount, there is caused the lack of beam quantity and hence all the signal charges thereon can not be derived. As a result, there are caused so-called white compression and a residual image phenomenon on a picture.

Therefore, in the prior art, a beam quantity control is carried out such that of the output signals from the television camera tube, a signal corresponding to the bright portion of an object is fed back to the beam current control electrode of the television camera tube, whereby the beam current, or the beam quantity is increased at the bright portion of the object to thereby avoid the lack of the beam quantity. Such technology is disclosed in, for example, U.S. Pat. No. 2,930,929, "AUTOMATIC BEAM CONTROL FOR TELEVISION CAMERA TUBES" invented by Shelton. That is, a beam current is detected from the photo-electric conversion screen (target) and a control voltage corresponding to the beam current is fed back to its grid.

According to this technology, since the beam current can be controlled in response to the signal charge (corresponding to the brightness of an object) generated on the photo-electric conversion screen, the signal charges on the photo-electric conversion screen can be erased uniformly.

Therefore, this technology is an epoch-making technology which can avoid the lack of the beam quantity.

As an improved invention of the former U.S. Pat. No. 2,930,929, there is proposed such one, which is disclosed in U.S. Pat. No. 3,999,011, "METHOD AND SYSTEM FOR CONTROLLING ELECTRON BEAM QUANTITY IN CAMERA TUBE" invented by Sato et al., in which a beam current is increased only in the portion in which the brightness exceeds a predetermined brightness.

It should be noted that "to increase the beam current" means that the diameter of an electron beam gets large. In other words, when the beam current is varied, the diameter of beam is also varied. Hence, the beam spot produced on the photo-electric conversion screen is varied, too.

By the way if the beam quantity is controlled only in such a manner that the signal corresponding to the bright portion of the object is fed back to the beam current control electrode, the following defects will occur.

When an electron beam 1 scans on a photo-electric conversion screen 2 as shown in FIG. 1, if the beam, which scans a line n, is increased in beam quantity due to the increase of the beam current by the beam quantity control operation and the diameter of beam gets large as shown by reference numeral 3 in FIG. 1, the beam 1 comes to scan also an adjacent line n+1 at the same time. Under this state, the signal from the television camera tube becomes the sum of signals from the line n and the line n+1, increasing the level of the signal. Accordingly, the beam quantity control is carried out so as to increase the beam quantity. Next, when the beam 1 scans the line n+1, the line n+1 is already scanned by the electron beam 1 so that the level of the output signal from the television camera tube is decreased. Hence, the beam quantity control is not carried out substantially and the control signal becomes a reference bias value.

When the electron beam 1 scans a line n+2, the scanning operation of the electron beam 1 becomes the same as that carried out when the electron beam 1 scans the line n. Further, when the electron beam 1 scans a line n+3, the scanning operation of the electron beam 1 becomes the same as that carried out when the electron beam 1 scans the line n+1. As a result, the positive feedback is applied and hence an oscillation is caused. The output signal at that time is shown in FIG. 2.

The oscillation, when the electron beam 1 scans the scanning line including the adjacent scanning line, appears as a $\frac{1}{2}f_H$ ($f_H$ is the horizontal frequency) mode (line crawl mode).

In order to avoid such oscillation, in the prior art, as is disclosed in U.S. Pat. No. 3,999,011, it is known to insert a non-linear circuit into a feedback loop which feeds back the output signal of the television camera tube to its beam current control electrode or to form a negative feedback loop by the detection of a returned electron beam.

In the case of the former technology, it is very cumbersome to adjust the feedback quantity and to adjust a predetermined signal level of the output signal from the television camera tube at which the beam quantity should be increased. While, in the case of the latter technology, this technology can not be applied to a Gunn diode type image pickup tube or camera tube.

As will be clear from the principle of the afore-mentioned oscillation, since there is such a factor that the diameter of the electron beam is varied in response to the beam quantity or the like, the beam quantity can be adjusted at a certain time point but the oscillation or the insufficiency of beam quantity will occur at other time point after a certain time passed. Thus, the latter technology considerably lacks in stability including a secular variation.

OBJECTS AND SUMMARY OF THE INVENTION

Accordingly, it is an object of this invention to provide an automatic beam current control system for television camera by which an image picked up signal of high definition can be produced.

Another object of this invention is to provide an image pickup apparatus which can produce an image picked up signal having no line crawl component.

Further object of this invention is to provide an image pickup apparatus in which a feedback loop is provided so as to control a beam current by using a target current, wherein a proper beam current can be produced stably.

According to one aspect of the present invention, in an image pickup apparatus in which a beam quantity is controlled so as to become such one corresponding to the variation of the incident light amount thereon by supplying a signal corresponding to a target current of a television camera tube to a beam current control electrode of the television camera tube, there is provided an automatic beam current control system for television camera in which the signal corresponding to the target current is supplied through a line adder circuit to the beam current control electrode of the television camera tube.

These and other objects, features and advantages of the present invention will become apparent from the following detailed description of the preferred embodiments taken in conjunction with the accompanying drawings, throughout which like reference numerals designate like elements and parts.

DESCRIPTION OF THE PREFERRED EMBODIMENTS

Now, the present invention will hereinafter be described with reference to the attached drawings.

Figure 1:
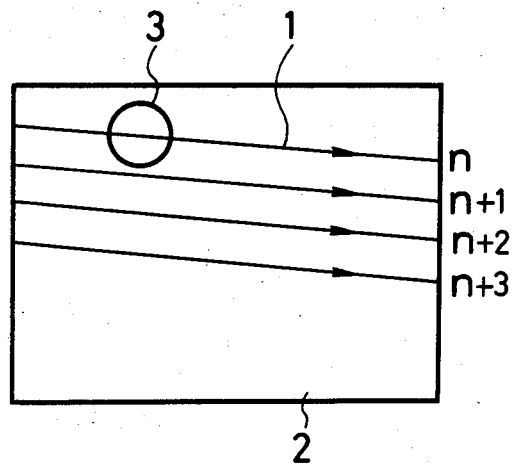
FIGS. 1 and 2 are respectively diagrams useful for explaining a principle of an oscillation of a beam quantity control loop.
Figure 2:
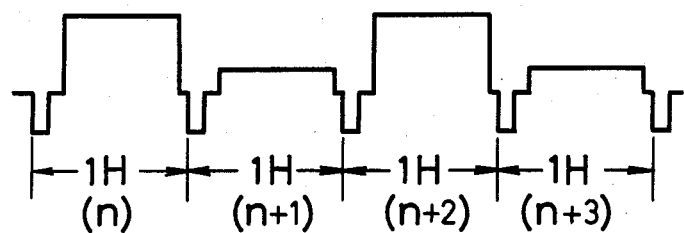
Figure 3:
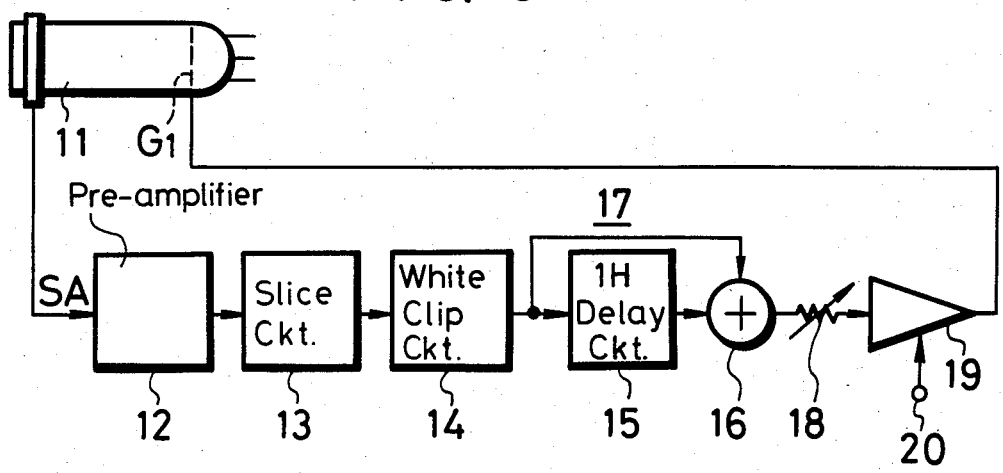
FIG. 3 is a block diagram showing an embodiment of an automatic beam current control system for television camera according to the present invention.

FIG. 3 is a block diagram showing an embodiment of an automatic beam current control system for television camera according to the present invention.

Figure 4:
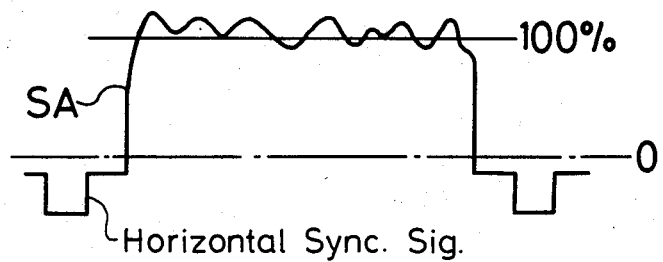
FIG. 4 is a diagram useful for explaining the operation thereof.

Referring to FIG. 3, an output signal SA (refer to FIG. 4) from an image pickup tube or television camera tube 11 is supplied to a pre-amplifier 12 and thereby amplified, which is then fed to a slice circuit 13. From the slice circuit 13, there is derived a part of the output signal SA having a level higher than 100% as shown in FIG. 4. The output signal from the slice circuit 13 is supplied to a white clip circuit 14 in which a signal portion of higher than a predetermined level is clipped. The white clip circuit 14 is used because the electron beam quantity can not be increased more than a predetermined quantity and also because a certain television camera tube can not emit the electron beam any more if the quantity of the electron beam exceeds a predetermined value.

The output signal from the white clip circuit 14 is supplied to a line adder circuit 17 formed of a one horizontal (1H) period delay circuit 15 and an adder circuit 16 in which a $\frac{1}{2}f_H$ component is removed by averaging the present signal and the signal of one horizontal period before. The output signal from the line adder circuit 17 is supplied through a gain adjusting circuit 18 and an amplifier 19 to a beam current control electrode $G_1$ of the television camera tube 11. A bias set signal is applied through a terminal 20 to the amplifier 19 by which a reference bias voltage for the television camera tube 11 is set. That is, the reference beam quantity is determined.

According to this circuit arrangement shown in FIG. 3, since the $\frac{1}{2}f_H$ component, which will cause the oscillation, is completely removed by the line adder circuit 17, the positive feedback loop of the oscillation is cut off. Accordingly, even if any oscillation is caused and hence the $\frac{1}{2}f_H$ component is generated in the output signal from the television camera tube 11, such line crawl component $\frac{1}{2}f_H$ will not be produced in the beam current control electrode $G_1$ so that the $\frac{1}{2}f_H$ component in the output signal disappears. Therefore, it is possible to reduce the adjusting processes for preventing the occurrence of oscillation and avoiding the lack of beam quantity unlike the prior art.

In this case, it is sufficient that the frequency characteristic of the delay circuit 15 in the line adder circuit 17 may cover the frequency band of about 1MHz. Accordingly, as the delay circuit 15, it is not necessary to use an expensive glass delay line but it is possible to use a delay circuit using a CCD (charge coupled device).

Figure 5:
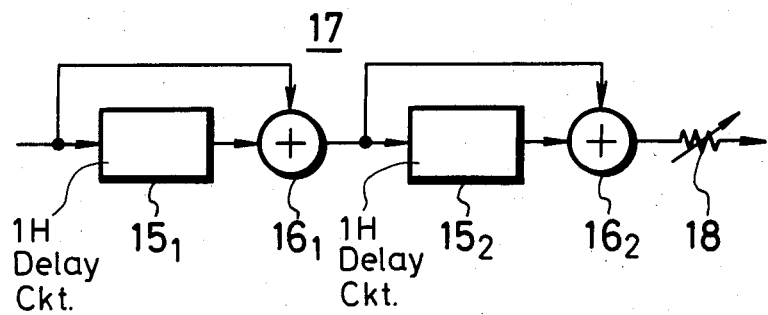
FIGS. 5 and 6 are respectively block diagrams showing main parts of other embodiments of the automatic beam current control system for television camera according to this invention.
Figure 6:
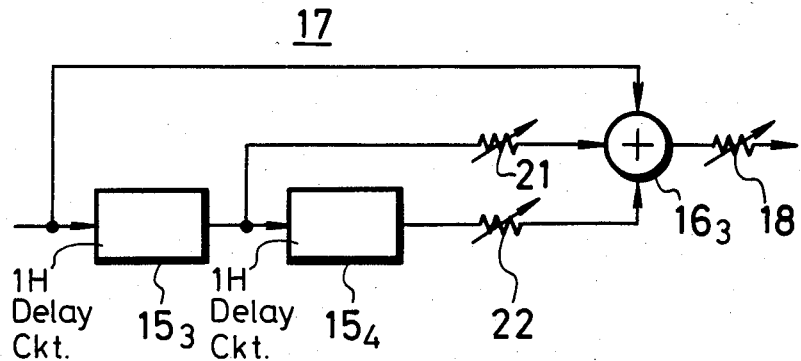

In the embodiment of FIG. 3, since the diameter of electron beam is expanded up to the adjacent line, one 1H delay circuit 15 is used to form the line adder circuit 17. However, if the diameter of electron beam becomes larger and the line succeeding to the adjacent line must be taken into consideration, the line adder circuit 17 may be formed as shown in FIGS. 5 and 6. In FIGS. 5 and 6, like parts corresponding to those of FIG. 3 are marked with the same references and will not be described in detail.

In the embodiment of FIG. 5, the output signal from the white clip circuit 14 (not shown in FIG. 5) is supplied to a 1H delay circuit $15_1$ and an adder circuit $16_1$ by which the present signal of the output signal from the white clip circuit 14 and the signal of one horizontal period before are averaged. Then, this averaged signal is supplied to a 1H delay circuit $15_2$ and an adder circuit $16_2$ by which the present averaged signal and the averaged signal of one horizontal period before are averaged.

Further, in the embodiment of FIG. 6, the present signal of the output signal from the white clip circuit 14 (not shown in FIG. 6), the signal of one horizontal period before from a 1H delay circuit $15_3$ and the signal of two horizontal periods before from a 1H delay circuit $15_4$ which is connected to the next stage of the delay circuit $15_3$ are added by an adder circuit $16_3$. In this case, it is possible that level adjusting circuits 21 and 22 are provided for the respective output signals from the delay circuits $15_3$ and $15_4$, and thereby an adding ratio in the adder circuit $16_3$ may be adjusted.

It is needless to say that the automatic beam current control system for television camera of the present invention can be applied to both a television camera tube of single tube type and a television camera tube of multi-tube type.

According to the present invention as set forth above, since the line adder circuit is inserted into the feedback loop which feeds back the signal corresponding to the level of the image picked up output signal to the beam current control electrode of the television camera tube to thereby remove the $\frac{1}{2}f_H$ line crawl component which will cause the oscillation, the beam quantity can be controlled stably without causing the oscillation.

Furthermore, since the cause of the oscillation is removed, it is possible to reduce the number of the adjusting processes for controlling the quantity of electron beam.

The above description is given on the preferred embodiments of the invention but it will be apparent that many modifications and variations could be effected by one skilled in the art without departing from the spirits or scope of the novel concepts of the invention so that the scope of the invention should be determined by the appended claims only.

We claim as our invention

1. An automatic beam current control system for a television camera in which a beam current is detected from a target electrode of a camera tube and a beam current control signal is supplied to a beam current control electrode of the camera tube to thereby control the beam current comprising:
   (a) beam current detecting means for detecting a beam current from a target current delivered from said target electrode of said camera tube;
   (b) wave reshape means connected to said beam current detecting means for reshaping a waveform by a non-linear circuit;
   (c) line adder means connected to said wave reshape means for generating a beam current control signal derived by adding a signal obtained by scanning a first line with an electron beam and a signal obtained by scanning a second line near said first line; and
   (d) beam current control electrode drive means supplied with said beam current control signal for generating an electron beam of a predetermined intensity.

2. Automatic beam current control system for television camera according to claim 1, in which said line adder means is formed of at least one local adder means, each local adder means comprising one horizontal period delay line and one adder which adds the beam current of a present line and a beam current of one horizontal period before said present line to thereby deliver the beam current control signal.

3. Automatic beam current control system for television camera according to claim 2, in which said line adder means comprises a plurality of local adder means connected in cascade.

4. Automatic beam current control system for television camera according to claim 2, in which said one horizontal period delay line is a glass delay line.

5. Automatic beam current control system for television camera according to claim 2, in which said one horizontal period delay line is a semiconductor delay line.

6. Automatic beam current control system for television camera according to claim 5, in which said semiconductor delay line comprises a CCD (charge coupled device).

7. Automatic beam current control system for television camera according to claim 1, in which said line adder means is formed of two one horizontal period delay lines and at least one adder which adds the beam current of a present line, the beam current of one horizontal line before said present line and the beam current of two horizontal periods before said present line to thereby deliver the beam current control signal.

* * * * *